United States Patent
Winterberg

(10) Patent No.: US 9,580,239 B2
(45) Date of Patent: *Feb. 28, 2017

(54) REINFORCED FOOT FOR AGRICULTURAL COMMODITY BIN

(71) Applicant: William Winterberg, Ceres, CA (US)

(72) Inventor: William Winterberg, Ceres, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,628

(22) Filed: Mar. 17, 2015

(65) Prior Publication Data

US 2015/0191306 A1    Jul. 9, 2015

Related U.S. Application Data

(63) Continuation of application No. 13/790,723, filed on Mar. 8, 2013, now Pat. No. 9,079,707.

(Continued)

(51) Int. Cl.
*B65D 6/28* (2006.01)
*B65D 90/12* (2006.01)
(Continued)

(52) U.S. Cl.
CPC ........... *B65D 90/12* (2013.01); *A01F 25/14* (2013.01); *B23P 6/00* (2013.01); *B23P 11/00* (2013.01); *B65D 19/18* (2013.01); *B65D 2519/00034* (2013.01); *B65D 2519/00069* (2013.01); *B65D 2519/0096* (2013.01); *B65D 2519/00129* (2013.01); *B65D 2519/00174* (2013.01);
(Continued)

(58) Field of Classification Search
CPC ....... A47B 13/021; A47B 91/00; A47B 91/02; A47B 91/024; F16B 12/48; F16B 12/44; F16B 12/46; B65D 25/24

USPC .............. 248/188, 188.8, 188.9, 346.5, 615, 618,248/688; 297/463.1; 403/381; 108/51.11; 220/630

See application file for complete search history.

(56) References Cited

U.S. PATENT DOCUMENTS 2,305,790 A   12/1942 Martin
3,331,529 A   7/1967 Slapnik
(Continued)

FOREIGN PATENT DOCUMENTS

DE   3104279 A1   9/1982
DE   3423259 A1   1/1986
(Continued)

OTHER PUBLICATIONS

PCT—ISA dated Sep. 4, 2013.

(Continued)

*Primary Examiner* — Steven A. Reynolds
*Assistant Examiner* — Javier A Pagan
(74) *Attorney, Agent, or Firm* — Mark D. Miller; William K. Nelson

(57) ABSTRACT

Disclosed are structures for protecting the lower corners of containers used for storing and shipping agricultural commodities, and related methods of use. More particularly, removable reinforced feet or toes for protecting the lower corners of agricultural commodity bins are disclosed. The reinforced feet or toes are resistant to damage and may be easily removed, repaired and replaced. In embodiments of the invention, the feet or toes are provided with one or more removable reinforcement structures that may be removed and replaced by new structures when worn or damaged, without requiring removal of the feet or toes themselves.

17 Claims, 13 Drawing Sheets

Related U.S. Application Data

(60) Provisional application No. 61/650,422, filed on May 22, 2012.

(51) Int. Cl.
*B23P 11/00* (2006.01)
*B23P 6/00* (2006.01)
*A01F 25/14* (2006.01)
*B65D 19/18* (2006.01)

(52) U.S. Cl.
CPC ............. *B65D 2519/00273* (2013.01); *B65D 2519/00288* (2013.01); *B65D 2519/00323* (2013.01); *B65D 2519/00338* (2013.01); *B65D 2519/00442* (2013.01); *B65D 2519/00572* (2013.01); *B65D 2519/00621* (2013.01); *B65D 2519/00666* (2013.01); *B65D 2519/00975* (2013.01); *Y10T 29/4973* (2015.01); *Y10T 29/49826* (2015.01)

(56) References Cited

U.S. PATENT DOCUMENTS

| | | | |
|---|---|---|---|
| 3,442,412 A | | 5/1969 | Munroe |
| 3,480,178 A | | 11/1969 | Morgan |
| 3,682,351 A | | 8/1972 | De Putter |
| 3,700,137 A | | 10/1972 | Souza |
| 3,958,712 A | | 5/1976 | Martin |
| 3,985,258 A | * | 10/1976 | Quigley et al. ............... 220/4.28 |
| 4,082,214 A | | 4/1978 | Baker |
| 4,197,958 A | | 4/1980 | Zeni et al. |
| 4,210,274 A | | 7/1980 | Leonard |
| 4,662,532 A | | 5/1987 | Anderson et al. |
| 4,848,580 A | | 7/1989 | Wise |
| 4,887,731 A | | 12/1989 | Pett et al. |
| 4,923,158 A | * | 5/1990 | Saisho ........................ 248/188.8 |
| 4,932,530 A | | 6/1990 | Von Zuben et al. |
| 5,105,947 A | * | 4/1992 | Wise ............................. 206/519 |
| 5,154,297 A | | 10/1992 | Farley |
| 5,180,064 A | | 1/1993 | Elvin-Jensen |
| 5,183,178 A | | 2/1993 | Flemming |
| 5,201,432 A | | 4/1993 | Elvin-Jensen |
| 5,360,133 A | | 11/1994 | Corby et al. |
| 5,439,113 A | * | 8/1995 | Elvin-Jensen ................ 206/509 |
| 5,460,292 A | | 10/1995 | Holman |
| 5,535,907 A | | 7/1996 | Elvin-Jensen |
| 5,697,586 A | * | 12/1997 | Lybarger ................... 248/188.4 |
| 5,752,602 A | | 5/1998 | Ackermann et al. |
| 5,794,818 A | | 8/1998 | Bromwell et al. |
| 5,878,984 A | * | 3/1999 | Grieser et al. ............. 248/188.8 |
| D420,219 S | | 2/2000 | Elvin-Jensen et al. |
| D459,888 S | | 7/2002 | Elvin-Jensen et al. |
| 6,752,285 B1 | | 6/2004 | Scalf |
| D591,047 S | | 4/2009 | Elvin-Jensen |
| 2001/0019056 A1 | | 9/2001 | Rosenfeldt |
| 2002/0070215 A1 | | 6/2002 | Walsh et al. |
| 2002/0125308 A1 | | 9/2002 | McLeod |
| 2003/0080024 A1 | | 5/2003 | Vourganas |
| 2004/0129699 A1 | | 7/2004 | Williams |
| 2007/0181587 A1 | | 8/2007 | Burnham et al. |
| 2011/0108549 A1 | | 5/2011 | Mitchell et al. |

FOREIGN PATENT DOCUMENTS

| | | |
|---|---|---|
| DE | 102008023565 A1 | 11/2009 |
| EP | 1440894 A1 | 7/2004 |
| GB | 447699 A | 5/1936 |
| GB | 1109015 A | 4/1968 |
| GB | 1317084 A | 5/1973 |
| GB | 1544798 | 4/1979 |
| GB | 2076366 A | 12/1981 |

OTHER PUBLICATIONS

Delbrouck, K., Crate, in particular for fruit or vegetables, English Abstract of German Patent Publication DE3104279, Jul. 28, 2004, European Patent Organization, http://www.epo.org/searching/free/espacenet.html.

Schnause, R.D., Transport container, in particular for transporting agricultural and horticultural produce, English Abstract of German Patent Publication DE3423259, Jan. 2, 1986, European Patent Organization, http://www.epo.org/searching/free/espacenet.html.

Dunz, T., and Dubois, J., Transport device for secured transport of goods to be conveyed, has four plastic corner spacers that are firmly connected with base and comprise supporting sections, on which cover rests in holdup condition, English Abstract of German Patent Publication DE102008023565, Nov. 12, 2009, European Patent Organization, http://www.epo.org/searching/free/espacenet.html.

Oster, H., and Bartusel, J., Stackable container, English Abstract of European Patent Publication EP1440894, Jul. 28, 2004, European Patent Organization, http://www.epo.org/searching/free/espacenet.html.

Macroplastics, Inc., Brochure for MacroBin 12 and 14 Series, available online at http://www.macroplastics.com/index.php-?products/overview/.

Macroplastics, Inc., Bin Repair Procedure Manual, available online at http://www.macroplastics.com/index.php?products/user-info/.

\* cited by examiner

FIG. 1-A

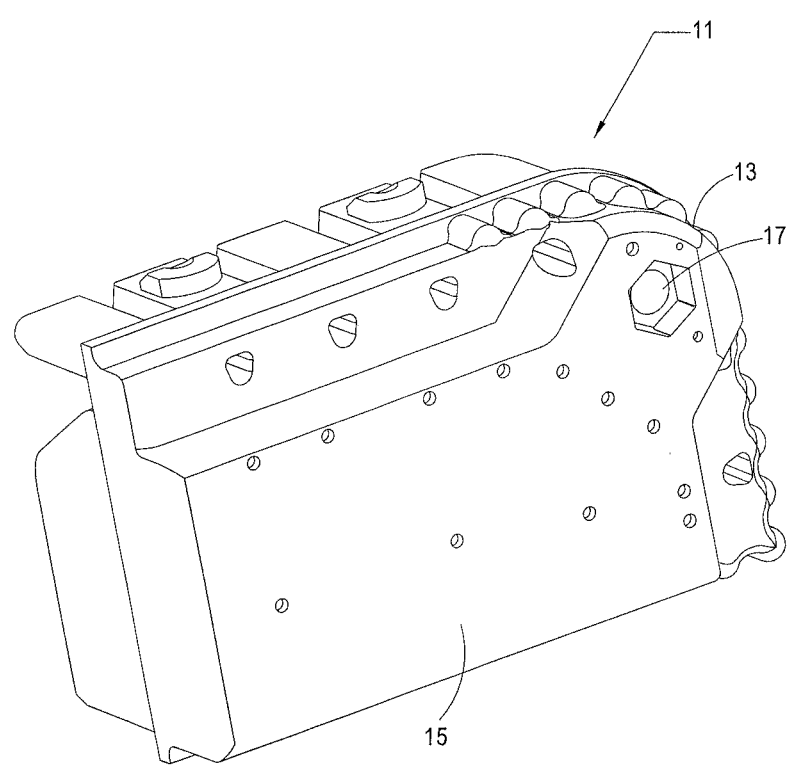
FIG. 2-A

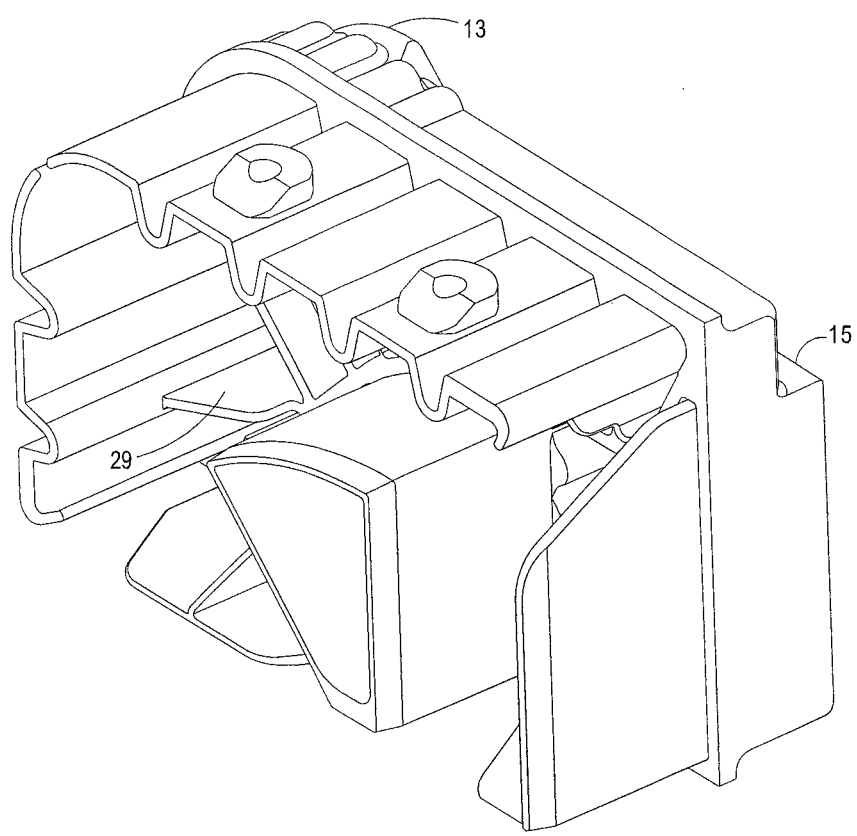
FIG. 3-A

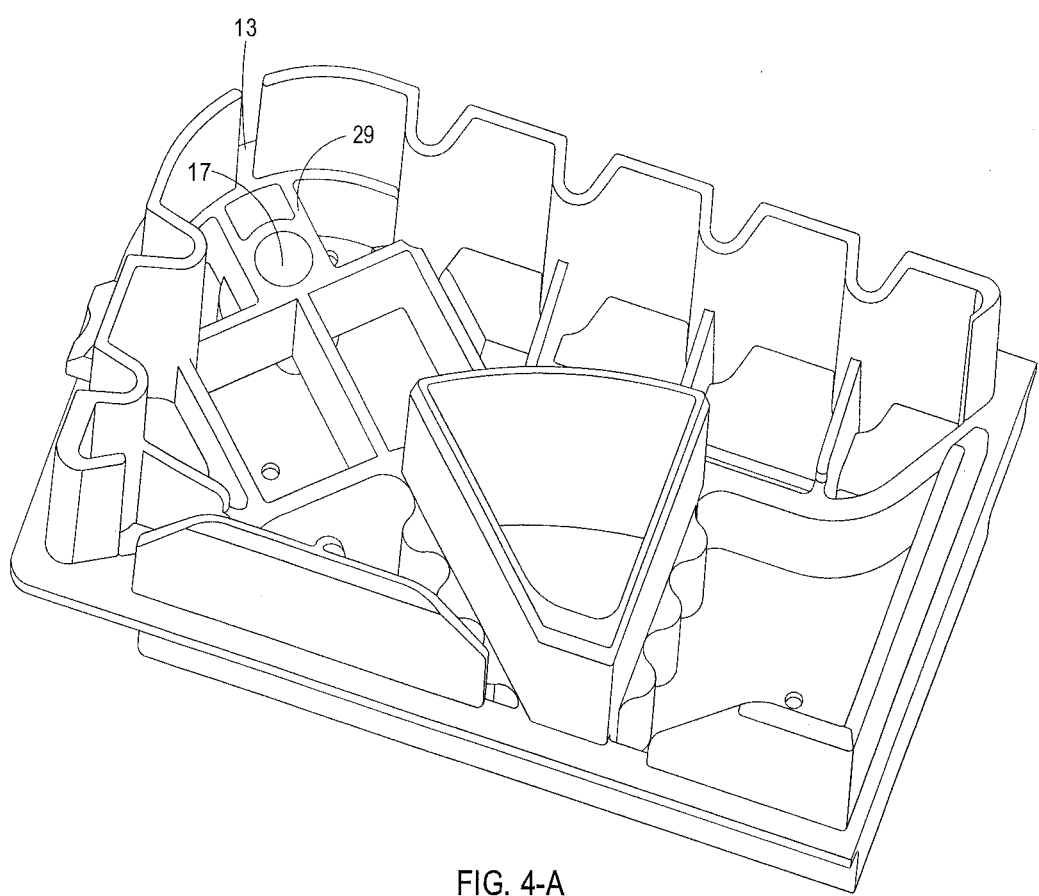
FIG. 4-A

REINFORCED FOOT FOR AGRICULTURAL COMMODITY BIN

This application is a continuation of pending U.S. patent application Ser. No. 13/790,723, filed on Mar. 8, 2013, which claims the benefit of U.S. Provisional Application No. 61/650,422 filed on May 22, 2012, which is incorporated herein by this reference in its entirety.

BACKGROUND OF THE INVENTION

1. Field of the Invention

The present invention relates to containers for harvesting and shipping agricultural commodities, and more particularly to removable reinforced feet or toes for agricultural commodity bins that are durable and resistant to damage and may be easily repaired or replaced, and related methods of use.

2. Description of the Prior Art

Reusable bins have long been in use for storing and transporting agricultural commodities. A typical agricultural storage bin includes a base and four sides, with an open top. The base of a typical bin is supported by a pair of rails which are provided in parallel along two opposite sides of the base. Some bins include a third parallel rail in the center. The rails typically define pairs of parallel slots for receiving the arms of a forklift for raising, lowering, and moving the bin.

In use, agricultural bins are typically moved extensively: to or from fields for filling with agricultural products, around warehouses and cold storage facilities, stacked on top of each other, loaded onto trucks using forklifts, etc. Loaded bins (containing agricultural products) are shipped to production areas such as a cannery, packing house, etc. Under normal conditions, the bins may be subjected to significant stress and/or abuse which often results in damage to the bin. Such damage may occur, for example, when a forklift operator drags a bin across a cement floor or other surface, particularly a rough surface. A forklift operator may also misalign the forks with the fork slots in a bin causing the fork to impact one or more of the support rails of the bin with significant force. The support rails of such containers may also experience damage when insufficiently raised during transport (e.g., the operator of a forklift uses the edges of the forks to slide a container on the floor without lifting the container, or without lifting it sufficiently) causing the rails to scrape across the floor or other abrasive surfaces.

The corners of agricultural bins are often subjected to the greatest damage resulting from uneven or rough handling as the bins are moved about. Since agricultural bins are frequently stacked, the corners require strength to support tall stacks of bins. If a bottom corner of a foot or toe of a bin has been damaged, it may not properly distribute the weight of that bin (including any bins above it) to the bin(s) below, resulting in an unstable stack of bins. Often the bottom corners of agricultural bins become so damaged that they are rendered unusable, requiring replacement of the rails that support them, or replacement the entire base of the bin.

Even a small amount of damage to one area of a support rail may require replacement of the entire rail (which runs along an entire bottom side of a bin), resulting in wasteful expenditures on replacement rails. Additionally, replacement of one or more damaged rails of an agricultural bin requires significant labor, including disassembling the bin and replacement of the damaged rails. Because of these costs, bins with damaged rails may continue to be used until the damage becomes so severe that the bin becomes unusable, at which point the damaged bin may simply be scrapped and replaced (at significant cost).

It is therefore desirable to provide sturdy, reinforced and inexpensive feet or toes for use on agricultural commodity bins that are resistant to damage, and that may be easily repaired, removed and/or replaced in the event of damage, thus providing an alternative to replacement of an entire support rail or an entire bin.

SUMMARY OF THE INVENTION

The present invention provides durable and resilient replacement feet (sometimes also referred to herein as toes) for use on agricultural commodity bins, and related methods of use, repair, and replacement. Embodiments of the feet or toes of the present invention are provided with reinforcing features, preferably but not necessarily made of metal, which resist damage from the harsh environments where the agricultural bins are used. The feet or toes of the present invention may be used to replace the rails on existing agricultural bins. For example, a single rail that extends along the underside of one side of an existing bin may be replaced by two such feet or toes, one at each end (corner) of one side of the bin. Similarly, a rail extending along the underside of the opposite side of the bin may be replaced by two additional feet or toes, so that one foot or toe may be provided in each corner of the bin.

According to embodiments of the present invention, reinforcement is provided at or near the outside edges and/or corners of the feet or toes. In some embodiments, the reinforcement is in the form of a removable bolt which may be screwed directly into the foot or toe, or engaged with a nut. Such a bolt assembly may be used to hold the foot or toe against the bottom of an agricultural bin, but it may also be provided only for reinforcement. In these embodiments, the bolt assembly itself (with nut, if provided) may be removed and replaced when damage occurs due to regular usage after wear and tear. This will reinforce the foot or toe, without necessarily replacing the entire foot.

In some embodiments, a recess is provided to receive the bolt head or a related structure so that it is generally flush with the bottom of the foot or toe when installed, preventing it from protruding out from the foot or toe assembly. The bolt head or related structure may be of any suitable shape, with the recess matching that shape. Normal wear and tear at the corner is expected to cause damage to the foot or toe itself, potentially causing exterior (e.g., metal, ceramic, rubber, or plastic material) portions of the foot to be dented, broken, and/or dislodged. However, the reinforcing assembly in the foot or toe is highly resistant to damage, such that even if some exterior portions of the foot may be damaged during normal use, that damage is stopped at the location of the reinforcement (such as the bolt head). The closer the reinforcing assembly is to an outside edge or corner of the foot, the less damage the foot will encounter before being stopped by the reinforcing assembly.

It is to be appreciated that multiple reinforcement assemblies or pieces of the types described herein may be provided in a single foot or toe of the present invention in order to provide increased resistance to damage. The reinforcement assemblies of the present invention are easily removed and replaced without necessarily replacing the foot or toe itself. However, even in the event of catastrophic damage to the foot or toe, replacement of the entire foot or toe with reinforcement assembly(ies) is a simple and inexpensive process allowing the agricultural bin to be placed back into use in a short time without compromising the integrity of the bin.

In various embodiments, numerous other and different kinds of reinforcement and reinforcing pieces may be provided in removable or permanent form, individually or with one or more other reinforcement embodiments described herein, preferably but not necessarily made of metal for increased resistance. For example and without limitation, a reinforcing piece may form the entire foot or toe, or the lower corner of the foot, or it may form (or cover or be attached to) only some portion thereof or a single foot or toe may be provided with one or more bolt assemblies together with an L-shaped corner reinforcement piece. It is preferred that the reinforcement(s) be made of metal because they will be less susceptible to damage and will resist wear and tear for longer periods of time than plastic, wood or other structural materials. Additionally, the reinforcement(s) may have a substantial thickness to increase the durability thereof.

In some embodiments, the head of the bolt may be of a large size to cover a greater area and provide greater resistance to damage. In some embodiments, a washer or other similar structure may be provided with or under the bolt head to provide a larger area of resistance to damage. Whatever form or size such a bolt assembly takes, it is preferred that there be a corresponding recess to receive the head and/or washer of the bolt assembly so that it does not protrude out from the bottom plane of the foot or toe (which could cause the bin to be uneven or tilted when at rest).

In some embodiments, the foot or toe itself may be made of durable and/or resilient material such as a rigid plastic, and the cross section of the foot or toe may include a plurality of plastic or other reinforcement areas in addition to one or more metal reinforcement pieces (such as, without limitation, the bolt assemblies discussed above). The additional reinforcement areas may be provided in the form of additional ribs, braces or cross-pieces, or thicker sections made of plastic or metal. It is to be appreciated that in some embodiments, the foot or toe and the reinforced portions may be part of a single molded plastic piece. In other embodiments these reinforcement features may be added on, such as the addition of internal or external metal reinforcement pieces.

Some important features of embodiments of the present invention include: (1) a durable and/or resilient corner foot or toe for an agricultural storage bin, (2) the reinforcement structure(s) in the foot or toe being easily replaceable; (3) the foot or toe itself being replaceable without having to remove the entire storage bin base or rail, and/or (4) the foot or toe being reinforced at or near the corner. The reinforcement may be one or more bolt assemblies, or other or additional reinforcement pieces provided at various locations in the foot or toe. The reinforcement may also be one or more sturdy (preferably metallic) pieces may cover and attach to the entire foot or toe, or some portion of the foot or toe, such as the lower corner of the foot or toe. In a further alternative, foot or toe itself may be a metal structure having structural reinforcements, such as webbing, ribs, and cross pieces that lend additional stability and strength.

In an exemplary use, reinforced feet or toes of the present invention are installed underneath the corners of an agricultural bin, either before the bin is used or as replacements to existing rails. The bins are then placed into use where the reinforcement features of the feet or toes resist damage from wear and tear as the bin is raised, lowered, loaded, unloaded and transported from one location to another, adding longevity to the usefulness of the bin. In the event that a foot or toe is damaged, the reinforcement structure(s) or the foot or toe itself may be easily, inexpensively, and quickly removed and replaced without requiring the removal or replacement of any of the other structures or feet or toes, allowing the bin to be placed back into service in a short time.

BRIEF DESCRIPTION OF THE DRAWINGS

The invention is further illustrated by the following drawings.

FIG. 2-A is a perspective bottom view of an alternative embodiment.

FIG. 3-A is a perspective end view showing upper and side surfaces of the alternative embodiment of FIG. 2-A.

FIG. 4-A is a top perspective view of the embodiment of FIG. 2-A.

DETAILED DESCRIPTION

Reference will now be made in detail to the illustrated embodiments of the invention. While the invention will be described in reference to the following detailed embodiments, it will be understood that the description is not intended to limit the invention to these embodiments. The invention is intended to cover alternatives, modifications, and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details.

Figure 1:
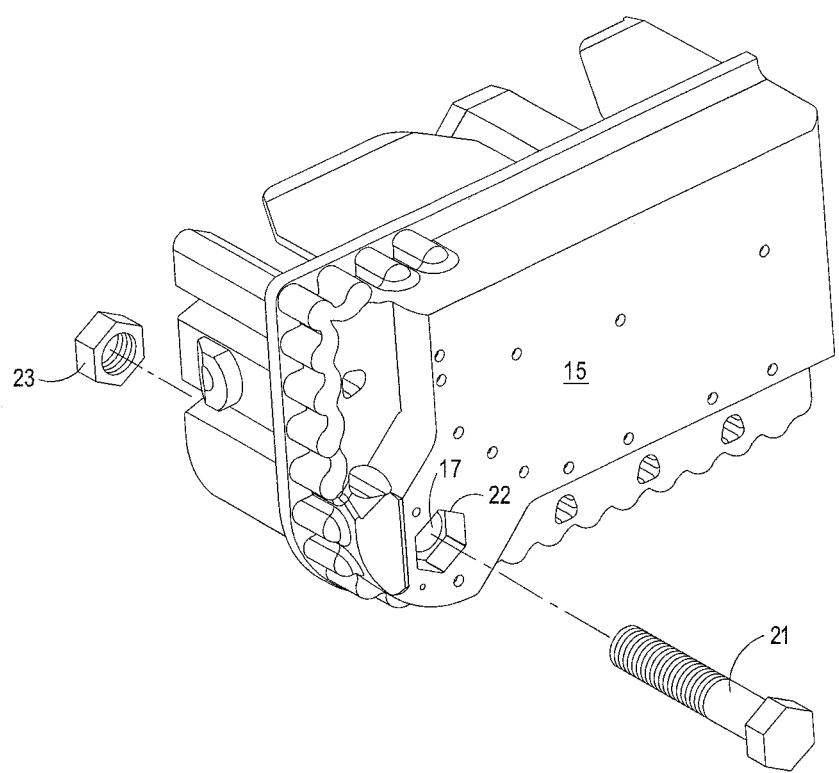
FIG. 1-A is an exploded perspective view of an embodiment of a reinforced foot of the present invention for use with an agricultural bin.
Figure 2:
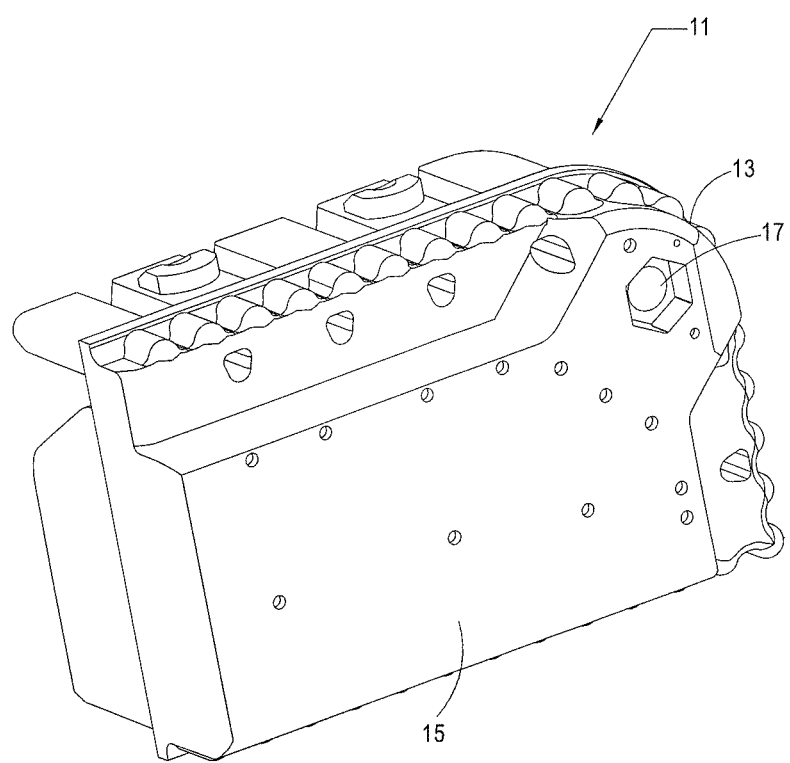
FIG. 2 is a perspective bottom view of the embodiment of FIG. 1, rotated relative to the view of FIG. 1.
Figure 9:
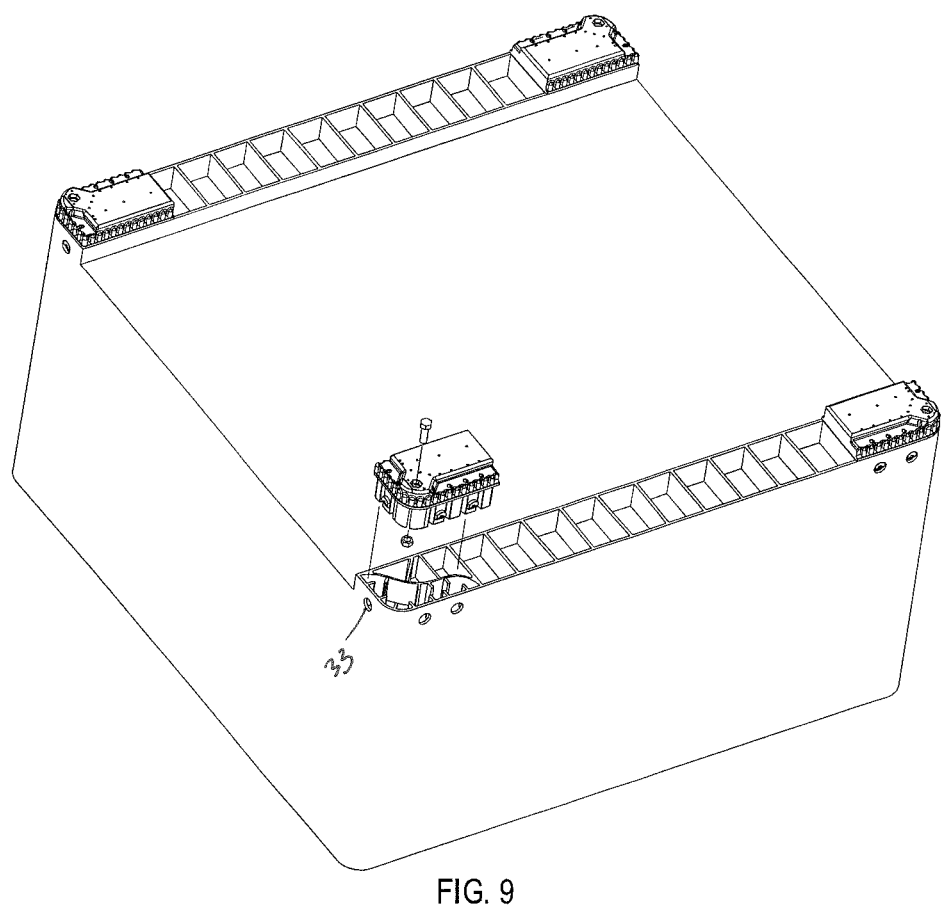
FIG. 9 is an environmental view showing installation of embodiments of the present invention onto an agricultural commodity bin.
Figure 10:
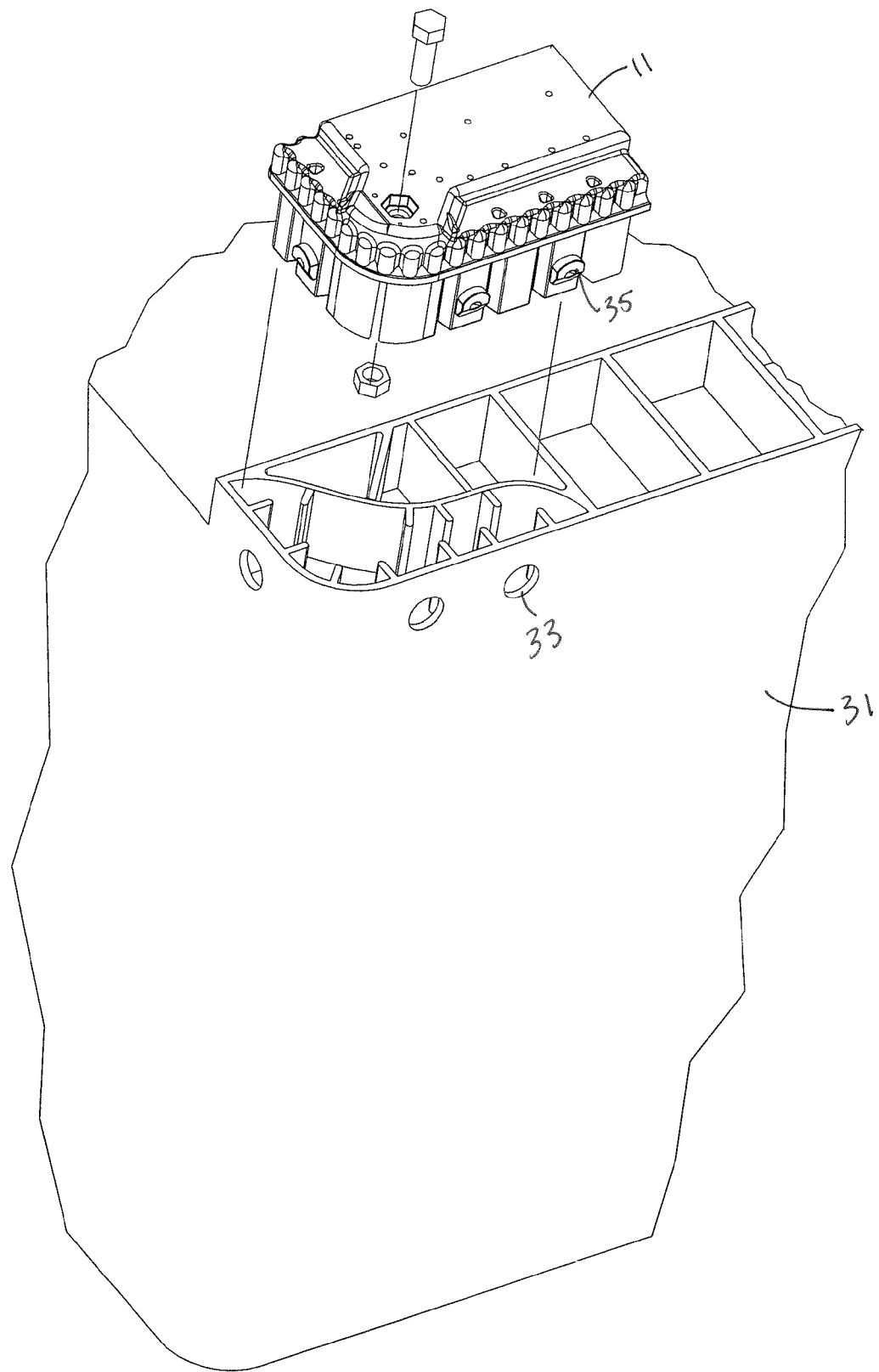
FIG. 10 is a detail view of the exploded corner of FIG. 9 showing how an embodiment of the present invention is installed onto an agricultural commodity bin.

Referring to the drawings wherein like reference characters refer to the same or equivalent structure throughout the several views, and referring particularly to FIGS. 1 and 10, it is seen that the illustrated embodiment of the invention includes a generally rectangular foot structure 11 having a rounded outer corner configured to attach to a corner of an agricultural crate or bin 31. The agricultural bins 31 typically have a rigid plastic structure with side supports or rails running along opposite sides of the bottom of the bin, as described above. The side supports typically have a width in the range of about two inches to about a foot (e.g., about 3 inches to about 7 inches, or any value or range of values therein). To add structural support, the side supports may have a pattern of reinforcements, including web-like patterns of ribs, plates, cross pieces, pegs, and other patterns in the body that help to support and distribute weight. In some embodiments, the presently disclosed foot structures may be tailored to have a complementary shape to the end corners of rails of a particular type of agricultural bin, to allow the foot or toe and the rail of the bin to interlock creating a tight connection. An example of such an embodiment is shown in FIGS. 9-10 where locking tabs 35 on the foot 11 interlock with openings 33 on bin 31. In such embodiments, additional fastening means may not be necessary. In other embodiments, the foot or toe may be usable with many different styles and models of agricultural bins. For example, the bin foot or toe may also be manufactured to have different sizes and different arrangements of reinforcing pegs and other structures to accommodate bins of various designs.

Figure 5:
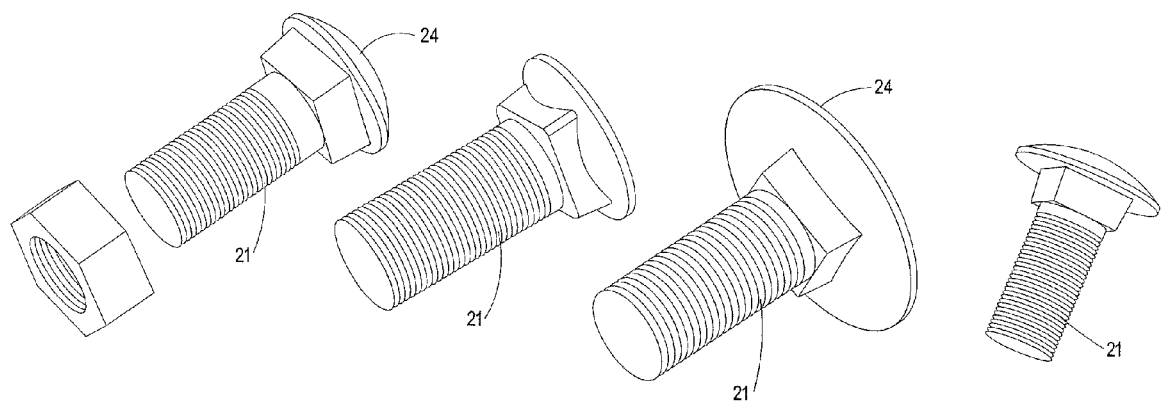
FIG. 5 illustrates several alternative embodiments for metallic reinforcement structures of the present invention.
Figure 6:
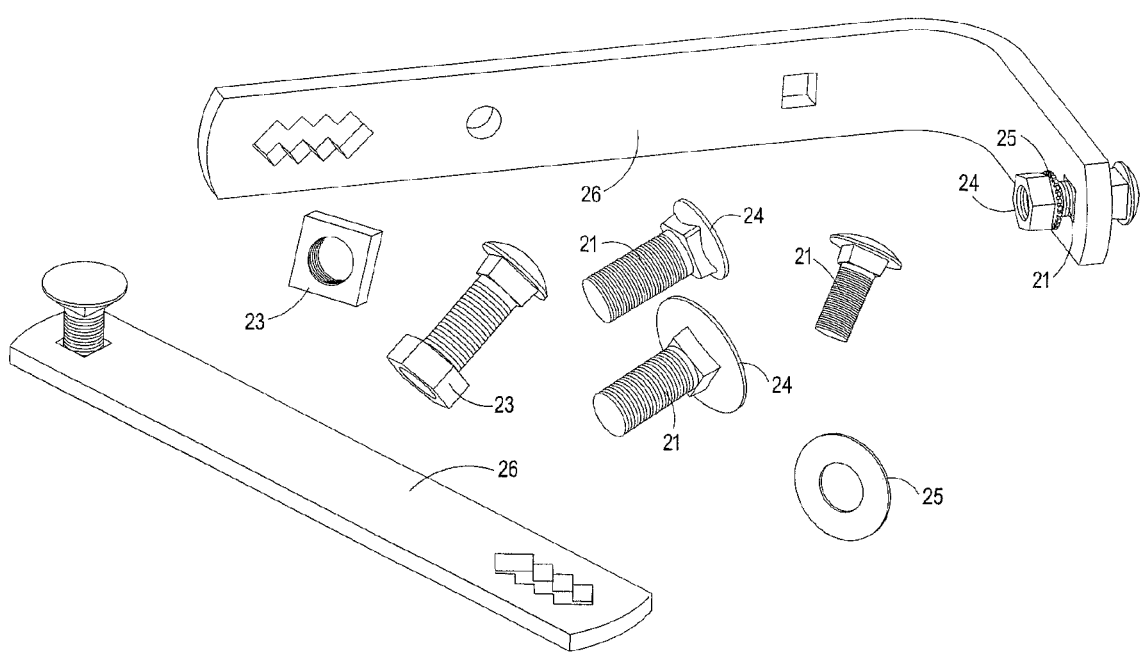
FIG. 6 illustrates further alternative embodiments for metallic reinforcement structures of the present invention.

Referring to FIGS. 1-4, in the exemplary illustrated embodiments, the foot or toe 11 generally has rectangular shape adapted to fit a corner of an agricultural bin. The bin foot or toe 11 may have a flat lower surface 15 and a rounded corner 13 that corresponds to a corner of an agricultural bin. Near the corner 13, one or more openings 17 may be provided for receiving one or more bolts 21 or other objects (e.g., metal rods, screws, and lockable pins) made of a durable and/or resilient material such as metal (e.g., steel, stainless steel, aluminum, aluminum alloys, and other metals and alloys). In preferred embodiments, a recessed area 22 is provided in surface 15 around opening 17 to receive the head 24 or other wide portion of the bolt or other object 25 (such as a washer) that is to be inserted into opening 17, as shown in FIGS. 1-A and 10. The recess may have various shapes (e.g., round, various polygonal shapes with sharp or rounded corners, rectangular, square, ellipses, etc.) and sizes (e.g., having a width, length, or diameter in a range from about ¼ inch to about 3 inches, or any value therein) to accommodate various washers, bolt heads, screw heads, nuts, and other fastening or locking structures, such as those shown in FIGS. 5 and 6. In some embodiments, bolt 21 may be provided in the form of a screw, and opening 17 may be threaded such that screw 21 may be screwed directly into opening 17, without the need for a corresponding nut 23. In other embodiments, as illustrated in FIG. 1, bolt 21 passes through opening 17 and threads into a nut 23 on the opposite side. In some embodiments, the head of the bolt or screw may be enlarged, or a washer may be provided, or both, to increase friction between the reinforcing structure and the bin foot or toe, thereby holding the reinforcing structure in place through collisions and impacts. For instance, the head 24 of bolt 21 may be enlarged for more frictional resistance to wear and tear (as shown in FIG. 5), and recessed area 22 may be correspondingly shaped to receive the large head 24. In some embodiments, bolt 15 may be provided with a washer or other structure 25 for more frictional resistance to wear and tear (as shown in FIG. 6), and recessed area 22 may be correspondingly shaped to receive this structure 25 or a part thereof.

In further embodiments, additional openings 17 (optionally with associated recesses 22) may be provided in lower surface 15 to receive additional bolts 21, or other similar reinforcing structures, preferably located near corner 15 to provide greater resistance to wear and tear. In such embodiments, the bin foot or toe may include, for example and without limitation, 2 to 6 holes for receiving reinforcing structures located near the corner of the bin foot. For instance, the plurality of holes may be located in a curve pattern along the corner of the bin foot or toe such that each of the plurality of holes is about equidistant from the edge of the bin foot or toe. In further embodiments, holes may be arranged in a triangular, linear or other suitable pattern.

Figure 7:
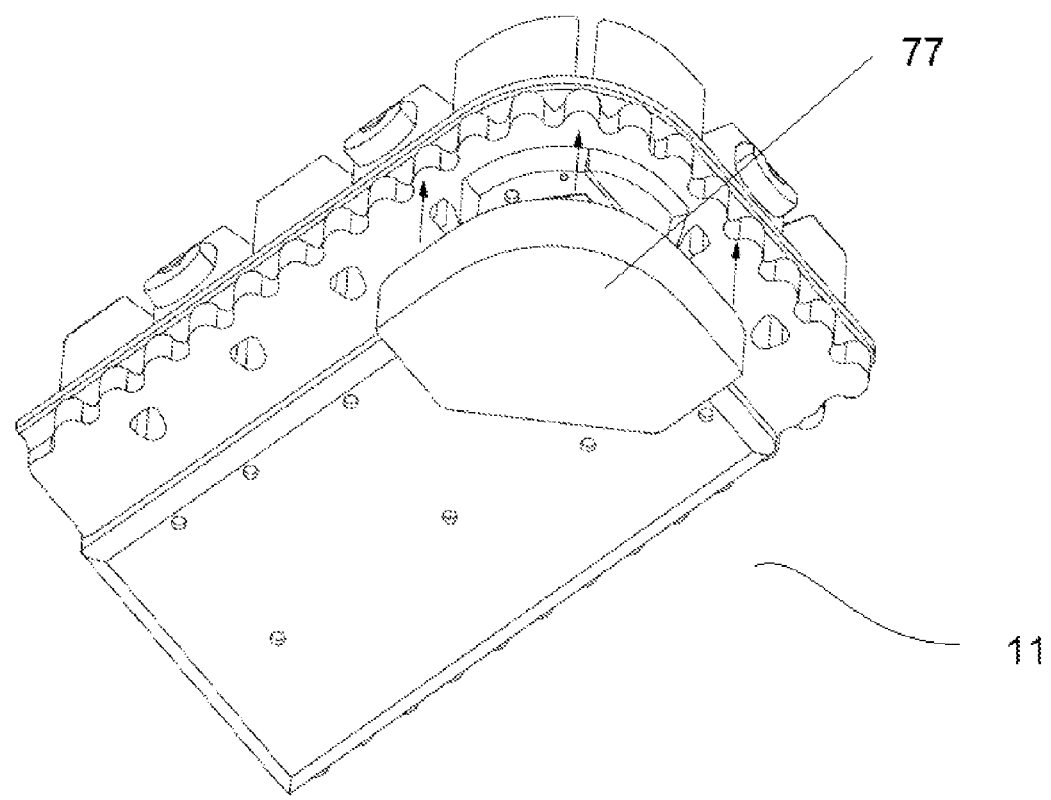
FIG. 7 is a perspective bottom view of an alternative embodiment of the present invention illustrating a removable corner piece.
Figure 8:
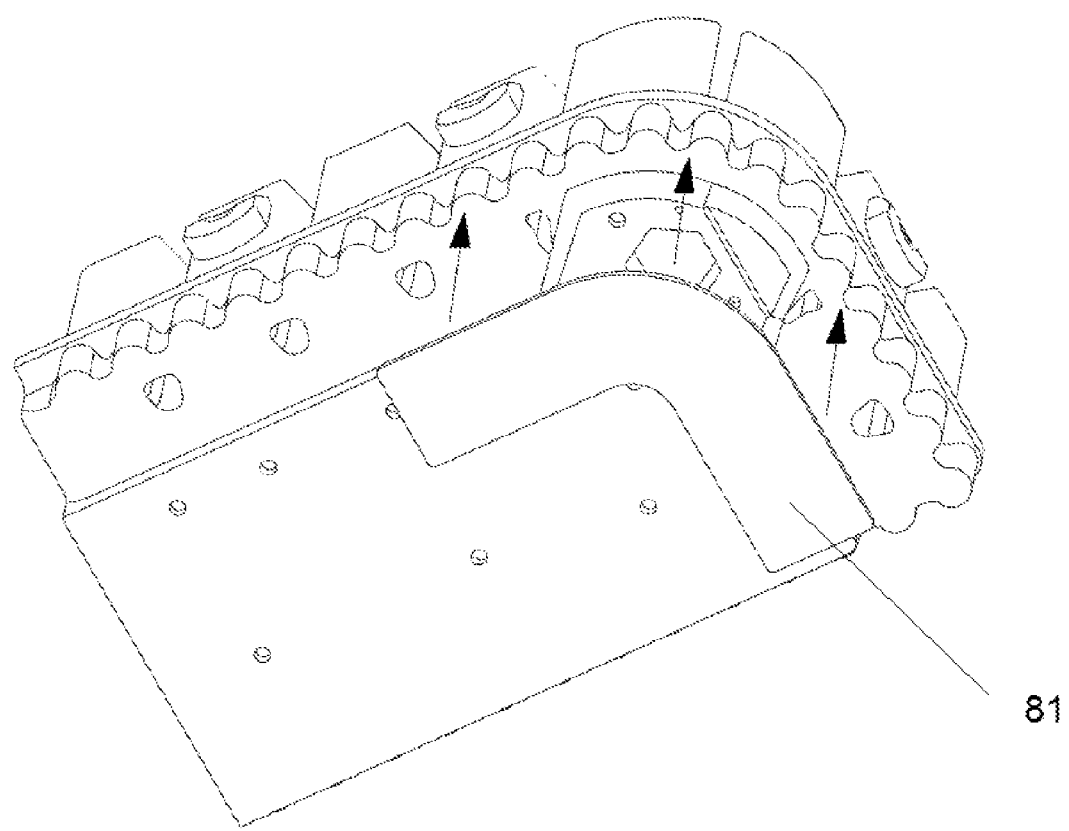
FIG. 8 is a perspective bottom view of an alternative embodiment of the present invention illustrating a different removable corner piece.

In some embodiments, one or more reinforcing strips, brackets, and/or corner covers 26 may be attached to or installed in the bin foot or toe to provide further durability to the bin foot or toe and/or to provide a barrier to impacts on the corner of the bin foot or toe. These additional reinforcing structures may comprise metal (e.g., steel, stainless steel, aluminum, aluminum alloys, and other metal materials), rigid durable plastics (e.g., thermosetting plastics formed from phenol resins, epoxy resins, polyimides, polyurethanes; vulcanized rubber; polyester fiberglass; etc.), and/or durable ceramic materials (e.g., composite ceramics comprising silica, alumina, zirconia, carbides, etc.). These structures 26 may be provided around the outside edge or perimeter of the foot or toe to resist wear and tear. For example, and without limitation, FIG. 7 illustrates a reinforced corner piece or big toe 26 that is shaped to conform to the rounded corner of foot 11; and FIG. 8 illustrates an L-shaped reinforcement bracket for attachment to the corner of foot 11. It is to be appreciated that any of the structures shown in FIGS. 5-8, as well as other suitable reinforcement structures may be provided as alternatives to or in addition to any of the reinforcement structures described herein. The lower corner of the bin feet may have a surface or recessed area that is complementary to the reinforcing strips, brackets, and/or corner covers to provide a secure fit with the reinforcing foot or toe of the present invention.

In some embodiments, corner 13 of foot 11 is provided with a removable reinforcing nose (77) which is held in place using a nut and bolt assembly. Nose 77 is similar to bracket 26 of FIG. 7, and is preferably made of metal, but may alternatively be made of a durable plastic or ceramic material. Because nose 77 is positioned at the corner 13 of foot 11, it resists wear and tear on the foot or toe 11, lengthening the useful life of the foot or toe. The head 24 of bolt 21 further resists damage to foot or toe 11. If damaged, nose 77 is easily removed by disassembling the nut and bolt, and attaching a different nose 77 and/or a different bolt.

In other embodiments, corner 13 of foot 11 is provided with a removable L-shaped strip (81) which may be held in place using a plurality of nut and bolt assemblies. Strip 81 is similar to bracket 26 of FIG. 8, and is preferably made of metal, but may alternatively be made of a durable plastic or ceramic material. Because strip 81 is positioned at the corner 13 of foot or toe 11, it resists wear and tear on the foot or toe 11, lengthening the useful life of the foot or toe. The head 24 of supporting bolts 21 further resists damage to foot or toe 11. If damaged, strip 81 is easily removed by disassembling the nut and bolt assemblies, and attaching a different strip 81 and/or different bolt(s).

FIGS. 5 and 6 illustrate different bolts 21 with optional nuts 23, and other reinforcement structures 26 that may be attached to or incorporated into the reinforced bin feet or toes of the present invention, preferably close to the outer corner. FIG. 6 illustrates a large planar structure and an L-shaped bracket that may be attached to the bottom of a foot or toe 11, optionally in a corresponding recessed area, so as to keep the foot or toe stable and level when in use, and provides additional protection to the agricultural bin rails.

Alternatively, a corner cover enclosing the curved portion of the bin foot or toe corresponding to the corner of the agricultural bin may be attached to the bin foot or toe. The corner cover may have one or more hole(s) for receiving bolt(s) 21 and may be attached to the bin foot or toe 11 by the one or more bolt(s) 21, or the corner cover may be configured to snap or lock into position on bin foot or toe 11, as shown in FIG. 10. In further embodiments, one or more horizontal and/or vertical straps may be attached to the exterior of the bin foot or toe, optionally in corresponding recessed areas in the bin foot or toe 11. The corner cover may be large enough to cover the all or portions of the outer sidewalls and/or the bottoms surfaces of the bin foot or toe 11. It is to be appreciated that numerous other reinforcing structures are contemplated within the scope of the invention and that these are only exemplary embodiments of some such structures that may be used.

Figure 3:
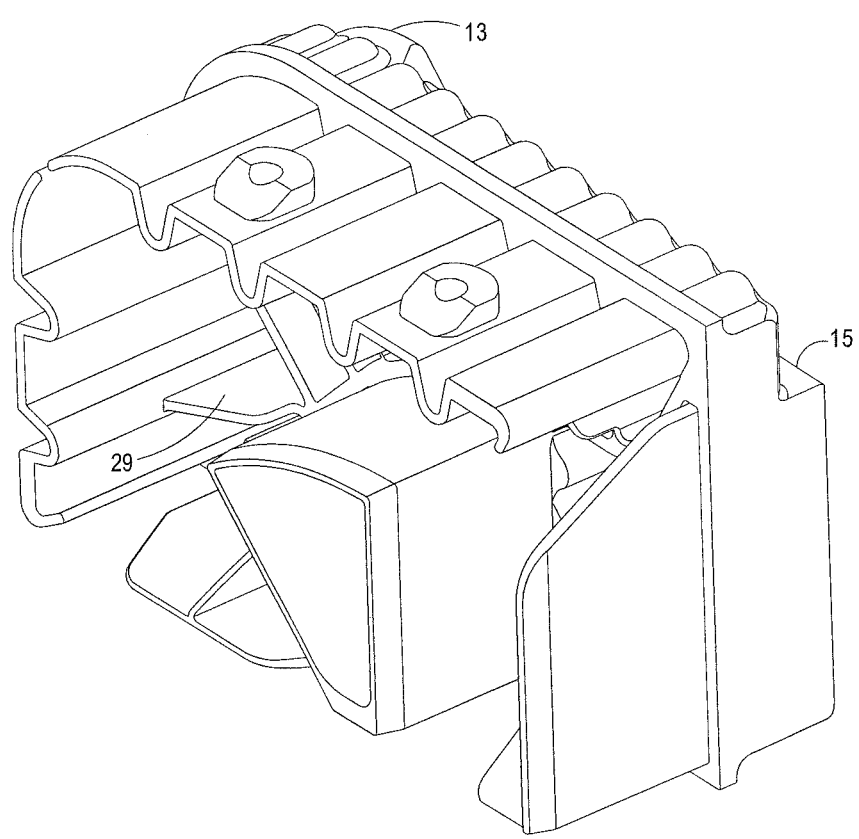
FIG. 3 is a perspective end view showing upper and side surfaces of the embodiment of FIG. 1.
Figure 4:
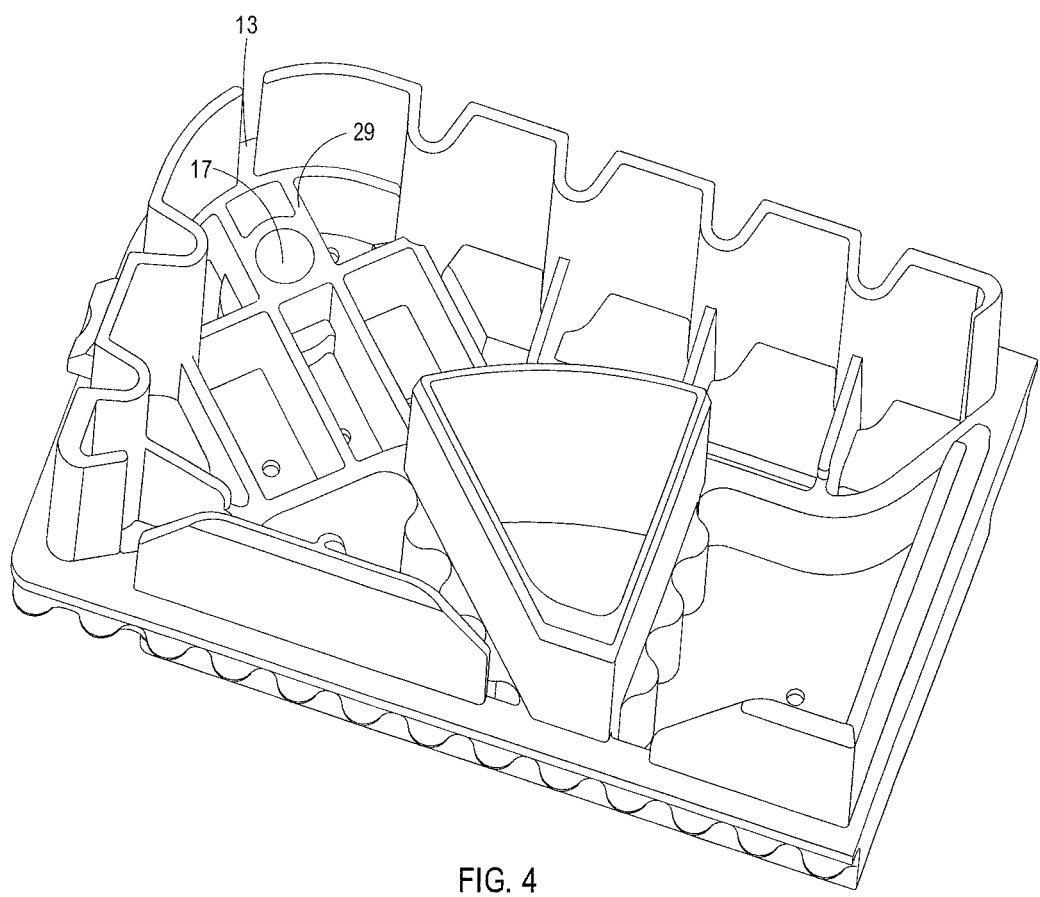
FIG. 4 is a top perspective view of the embodiment of FIG. 1.

In some embodiments, reinforced areas may be provided in the foot or toe 11 itself, in the form of a web-like pattern of ribs, braces, cross-pieces, or thickened sections 29, as shown in FIGS. 3 and 4. These pieces or sections 29 may be provided in a variety of sizes, shapes and thicknesses to provide additional reinforcement in the foot or toe itself. It is to be appreciated that in some embodiments, the foot or toe 11 and the reinforced portions 29 may be part of a single molded piece. In other embodiments these internal reinforcement features 29 may be added on. For example, additional internal metal or ceramic reinforcements may be added to the bin foot or toe 11.

In use, reinforced bin feet or toes 11 of the present invention are installed underneath the corners of an agricultural bin, either before the bin is used or as replacements to existing rails. The bin feet or toes 11 may be designed to have a complementary shape to the corners of the agricultural bin. Many agricultural bins are formed from molded plastics (e.g., high density polyethylene, polypropylene, etc.) and the side support structures of such bins have particular patterns of ribs, thickened portions, and other supporting structures. The bin feet or toes 11 can be designed to accommodate certain patterns in the underside of various agricultural bin rails. For instance, the bin foot or toe 11 may have a corrugated outer wall that corresponds to ridges in the wall of rail of a particular agricultural bin. Alternatively, the bin foot or toe may be adapted to fit a number of bins of a standard size. In such embodiments, the bin foot or toe may have a curved outer wall and a flat floor inside of the outer wall, and one or more holes for receiving screws, bolts, or lockable pegs for securing the bin foot to the rail of the agricultural bin. Optionally, either or both of the outer wall and floor of the bin foot or toe may have a sturdy, but compressible material (e.g., a dense polyurethane foam or other polymeric foam) to engage the structural pattern in the rail of the agricultural bin when the bin foot or toe is bolted, screwed, or otherwise secured to the side support of the agricultural bin.

Once the bin feet or toes are attached, the agricultural bins are then placed into use where the reinforcement features such as 24, 25, 26, 29 of the feet or toes resist damage from wear and tear as the bin is raised, lowered, loaded, unloaded and transported from one location to another, adding longevity to the usefulness of the bin. The flat bottom surface 15 allows for an easily stackable surface. In some embodiments, the bin feet or toes may have recesses that are complementary to corners formed by upper walls of the agricultural bin allowing the agricultural bins to be stacked in a nested manner.

In the event that any of the reinforcement structure(s) are damaged, they may be easily, inexpensively and quickly removed (for example, a bolt 15 may be unscrewed from opening 17) and replaced (another bolt 15 is screwed into opening 17) without requiring the removal or replacement of any of the other structures or the foot or toe 11 itself, allowing the bin to be placed back into service in a short time. In the event that a foot or toe 11 is severely damaged, it may be easily, inexpensively and quickly removed and replaced in a similar manner.

The present invention provides novel reinforced and inexpensive feet or toes for use on agricultural commodity bins that are resistant to damage, and that may be easily and quickly repaired, removed, and/or replaced in the event they are damaged, at low cost and without requiring replacement of an entire bin or support rail.

It is to be understood that variations, permutations, and modifications of the present invention may be made without departing from the scope thereof. In particular, one or more features of an exemplary embodiment as described herein may be practiced in conjunction with one or more features of other exemplary embodiments, all such of which are within the scope of the invention. It is also to be understood that the present invention is not to be limited by the specific embodiments disclosed herein, but only in accordance with the appended claims when read in light of the foregoing specification.

What is claimed is:

1. A resilient foot assembly for a stackable agricultural storage bin comprising:

a. a removable foot for attachment underneath one corner of said bin, said foot having a flat bottom surface including an outer corner located below an outer edge of said one corner of said bin, said flat bottom surface for bearing a portion of the weight of said bin and for placement on an upper corner of a second stackable agricultural bin, said foot having at least one recess near said outer corner located in said bottom surface of said foot, said at least one recess being closer to said outer edge of said removable foot than a midline of said removable foot; and b. at least one removable rigid reinforcing structure attached to said foot in said at least one recess, wherein a bottom end of said at least one removable rigid reinforcing structure is substantially flush coplanar with said bottom surface of said removable foot when said at least one removable rigid reinforcing structure is installed and secured in said at least one recess.

2. The foot of claim 1 wherein said at least one removable rigid reinforcing structure is a bolt, having a head, and said at least one recess has a shape corresponding to said head for receiving it.

3. The foot of claim 1 wherein said at least one removable rigid reinforcing structure is a combination of a bolt and at least one washer, said bolt having a head, wherein said at least one recess has a depth corresponding to the combined thickness of said head and said at least one washer and wherein said at least one recess has a shape corresponding to said washer.

4. The foot of claim 1 wherein a plurality of removable rigid reinforcing structures are provided in the form of bolts for insertion in a bottom surface of said foot, each such bolt having a head, and said foot is provided with a corresponding plurality of recesses in the bottom surface thereof for receiving said heads.

5. The foot of claim 1 wherein said removable foot has a contoured upper wall that is complementary to a shape of an outer wall of said corner of said bin, said contoured upper wall having at least one tab for engaging with a corresponding slot on said outer wall of said corner of said bin.

6. The foot of claim 1 wherein said at least one removable rigid reinforcing structure is removable from said foot without removing said foot from said storage bin.

7. The foot of claim 1 wherein said at least one removable rigid reinforcing structure does not directly or indirectly anchor said removable foot to said storage bin.

8. The foot of claim 1 wherein said removable foot has attachment structures for engaging with said one corner of said bin to secure said removable foot to said one corner of said bin, and said at least one removable rigid reinforcing structure does not directly or indirectly anchor said removable foot to said one corner of said bin.

9. The foot of claim 1 wherein said removable foot protects an outer edge of said one corner from damage from dragging along a surface and collisions, and said at least one removable rigid reinforcing structure resists breakdown of the corner of said removable foot.

10. The foot of claim 1 further comprising an attachment mechanism for connecting said removable foot to said bin.

11. An agricultural bin system for improving the resilience and extending the usable life of storage bins, said system comprising:
   a. a stackable storage bin having four weight bearing corners, each corner having an outer wall including at least one foot attachment structure for attachment to a foot;
   b. four removable feet, each for attachment to one of said four corners of said storage bin for protecting an outer edge of said one of said four corners, each of said feet comprising:
      a flat bottom surface including an outer lower corner for bearing a portion of the weight of said bin and for placement on an upper corner of a second stackable agricultural bin,
      at least one recess in said bottom surface of said lower corner, said at least one recess being near an outer edge of said one of said four corners when said foot is attached to said one of said four corners such that the at least one recess has a proximity to said outer edge of said one of said four corners that is less than a width of said recess, and
      an upper wall having at least one bin attachment structure for engaging said foot attachment structure of said one of said four corners; and
   c. at least one removable reinforcing structure inserted into the at least one recess of each of said removable feet, wherein said at least one removable reinforcing structure is substantially flush with said bottom surface when installed and secured in said recess, such that there is no more than a slight protrusion of said at least one removable reinforcing structure from said flat bottom surface of said foot.

12. The system of claim 11 wherein said at least one removable reinforcing structure does not attach to said storage bin.

13. The system of claim 11 wherein said upper wall of each of said removable feet has a contoured structure that corresponds to a contoured shape of said outer wall of one of said four corners of said bin.

14. The system of claim 11 wherein said upper wall has a complementary shape to a shape of said outer wall of one of said four corners.

15. An agricultural bin system for improving the resilience and extending the functional life of storage bins, said system comprising:
   a. a stackable storage bin having four weight bearing corners, each corner having a contoured outer wall including at least one foot attachment structure for attaching to a foot;
   b. four removable feet, each for attachment to one of said four corners of said storage bin, each of said feet comprising:
      a flat bottom surface including an outer corner for bearing a portion of the weight of said bin and for placement on an upper corner of a second stackable agricultural bin,
      at least one recess in a bottom surface of said outer corner, said at least one recess having a width, and an edge of said at least one recess is located less than said width from said outer corner of said flat bottom surface, and
      an upper wall having a contoured shape that is complementary to said contoured outer wall of said one of said four corners, and a bin attachment structure for engaging said foot attachment structure of said one of said four corners; and
   c. at least one reinforcing structure for each of said removable feet, each of said reinforcing structures installed and secured in the at least one recess in the bottom of one of said removable feet, wherein said at least one reinforcing structure is substantially coplanar with said bottom surface with no significant protrusion of said at least one reinforcing structure from said bottom surface and said at least one reinforcing structure does not attach to said storage bin when so installed.

16. The system of claim 15 wherein said reinforcing structures do not directly or indirectly anchor said removable feet to said storage bin.

17. The system of claim 15 wherein said removable feet protect said outer walls of said corners from damage from dragging along a surface and collisions, and said reinforcing structures resist breakdown of said outer corners of said removable feet.

* * * * *